(12) United States Patent
Moulds et al.

(10) Patent No.: US 7,231,274 B2
(45) Date of Patent: Jun. 12, 2007

(54) METHOD OF PROGRAMMING A TIRE MONITORING SYSTEM

(75) Inventors: Malcom L. Moulds, Northville, MI (US); Keith Christenson, Canton, MI (US)

(73) Assignee: Lear Corporation, Southfield, MI (US)

( * ) Notice: Subject to any disclaimer, the term of this patent is extended or adjusted under 35 U.S.C. 154(b) by 199 days.

(21) Appl. No.: 10/908,348

(22) Filed: May 9, 2005

(65) Prior Publication Data

US 2006/0253217 A1 Nov. 9, 2006

(51) Int. Cl.
- *G06F 19/00* (2006.01)
- *B60R 25/10* (2006.01)
- *B60C 23/00* (2006.01)
- *G01M 17/02* (2006.01)

(52) U.S. Cl. .............. 700/115; 340/426.33; 340/442; 340/447

(58) Field of Classification Search ........... 700/115; 340/442, 447, 426.33
See application file for complete search history.

(56) References Cited

U.S. PATENT DOCUMENTS

| | | | |
|---|---|---|---|
| 5,109,213 A | 4/1992 | Williams | |
| 5,424,746 A * | 6/1995 | Schwab et al. | ............... 342/49 |
| 5,602,524 A | 2/1997 | Mock et al. | |
| 5,682,143 A * | 10/1997 | Brady et al. | ............. 340/572.7 |
| 6,362,731 B1 | 3/2002 | Lill | |
| 6,369,703 B1 | 4/2002 | Lill | |
| 6,441,728 B1 | 8/2002 | Dixit et al. | |
| 6,518,876 B1 | 2/2003 | Marquet et al. | |
| 6,571,617 B2 | 6/2003 | Van Niekerk et al. | |
| 6,668,636 B2 | 12/2003 | Nantz et al. | |
| 6,691,567 B2 | 2/2004 | Walker et al. | |
| 6,693,522 B2 | 2/2004 | Tang et al. | |
| 6,753,767 B2 | 6/2004 | Lin et al. | |
| 6,809,639 B2 | 10/2004 | Marquet et al. | |
| 6,838,985 B2 | 1/2005 | Ghabra et al. | |
| 6,917,050 B2 * | 7/2005 | Lin | ...................... 250/559.22 |
| 6,920,785 B2 * | 7/2005 | Toyofuku | .................... 73/146 |
| 6,965,305 B2 | 11/2005 | Taguchi et al. | |
| 7,104,438 B2 * | 9/2006 | Benedict | ..................... 235/375 |
| 2003/0196312 A1 * | 10/2003 | Moore et al. | .................. 29/430 |

FOREIGN PATENT DOCUMENTS

| | | |
|---|---|---|
| EP | 1 026 015 A3 | 2/2003 |
| EP | 1 306 234 A1 | 5/2003 |
| WO | WO 03/082613 A1 | 10/2003 |

* cited by examiner

*Primary Examiner*—Anthony Knight
*Assistant Examiner*—Tom Stevens
(74) *Attorney, Agent, or Firm*—Brooks Kushman P.C.

(57) ABSTRACT

A process for identifying TPMS electronic wheel sensors on a production line is disclosed. The line of identification data is transmitted in digital bit stream between the electronic wheel sensor and the production line database. Data from the electronic wheel sensors is provided to the vehicle electronic control unit at a subsequent point on the assembly line.

14 Claims, 2 Drawing Sheets

METHOD OF PROGRAMMING A TIRE MONITORING SYSTEM

BACKGROUND OF THE INVENTION

1. Field of the Invention

The present invention relates to a vehicle manufacturing system for the installation of tire pressure monitoring systems (TPMS) in which the electronic wheel sensors are identified, and verified to the designated vehicle. A digital code is transmitted to identify the wheel sensors and may also specify the location of the wheel sensors on the vehicle.

2. Background Art

Tire pressure monitoring systems (TPMS) have been developed to monitor tire pressure levels and operating temperatures. It has been found that maintaining tire inflation to the proper pressure can improve vehicle performance and gas mileage. Government regulations have recently been adopted that encourage the adoption of tire pressure monitoring systems as original equipment in new vehicles.

Tire pressure monitoring systems have been developed that include a radio frequency link between sensors mounted to the tire or wheel and the vehicle's electrical system. In the vehicle manufacturing process, the tire pressure monitoring sensors must be activated and checked for operability. Tire pressure monitoring systems may be of a low level type wherein the tire pressure monitoring sensors indicate that there is a problem with regard to tire pressure, but do not identify the specific tire that is improperly inflated. Other more sophisticated systems include identification of a specific tire that is improperly inflated to the on-board diagnostic system of the vehicle.

In some manufacturing plants, several parallel assembly lines are provided to manufacture vehicles. In other manufacturing plants, one or more assembly lines may be split into a plurality of parallel line segments for installation of tire pressure monitoring systems, final vehicle assembly operations, and quality assurance testing. While parallel manufacturing lines and operations may improve the efficiency of assembly operations, problems arise when programmable radio frequency devices, such as electronic wheel sensors are installed, programmed and tested.

Radio frequency transmissions between the assembly line and the electronic wheel sensors are used to identify the wheel sensors to the on-board vehicle diagnostic system. Radio frequency transmissions must be limited in range and power. It is difficult to control radio frequency transmissions when production lines and programming stations are located in close proximity to one another, for example, when programming stations and wheel sensors are less than 10 meters apart. When in such close proximity, stray radio frequency transmission from one line programming station may be picked up by another line's programming station. This can result in erroneous programming of electronic wheel sensor identification information and complications in the programming process.

There is a need for a reliable and effective manufacturing system for programming electronic wheel sensors and their associated on-board diagnostic systems. This need is particularly strong in assembly plants having several production lines with multiple programming stations located in close proximity to one another that are used to activate, program and test electronic wheel sensors. With more sophisticated tire pressure monitoring systems, there is a need for a system that identifies the wheel location of an electronic wheel sensor on a vehicle.

SUMMARY OF THE INVENTION

According to one aspect of the invention, a method for registering wheel sensor identification designations in a manufacturing environment is disclosed. A plurality of vehicles are located on different assembly lines in close proximity to each other within the manufacturing environment. Each of the vehicles has a plurality of wheels having a sensor that is capable of receiving a command signal. The command signal is transmitted from an assembly line associated transmitter/receiver to the sensor associated with each wheel. A responsive signal is generated from the sensor that includes the unique sensor identification designation and an assembly line identifier. The unique sensor identification designation and assembly line identifier are recorded in an assembly line database. The wheel sensor identification designation and the assembly line identifier are registered in the assembly line database.

According to other aspects of the invention, the command signal may be transmitted through a directional finding antenna of a transmitter/receiver that is located close to one of the assembly lines. A responsive signal is received by the same assembly line associated transmitter/receiver that transmitted the command signal. The command signal may be broadcast at a first frequency with the responsive signal being broadcast at a second frequency that is different from the first frequency.

The step of recording the wheel sensor identification designation and assembly line identifier for each wheel sensor may further comprise communicating the wheel sensor identification designation for each wheel sensor from the assembly line database to the vehicle on-board control module at a subsequent station on the assembly line. Subsequently, the vehicle may be operated at a rolling test station on the assembly line to cause the wheel sensors to transmit data to an on-board control module after the wheel sensor identification has been communicated to the on-board control module. The method may also comprise indicating the operational status of the wheel sensors on assembly line production information system displays.

According to another aspect of the invention, a method of installing a plurality of tire pressure monitoring systems on a plurality of vehicles on separate assembly lines is provided. An initial step of the method is sensing the presence of a vehicle on the assembly line. A first radio frequency (RF) signal is then sent from an assembly line associated transmitter/receiver system to a selected one of the plurality of electronic wheel sensors. The first signal includes at least a command code and a line identification code. A second RF signal is sent in response to the command code from the electronic wheel sensor to the assembly line transmitter/receiver system. The second RF signal has an electronic wheel sensor identification code and the line identification code and may include other data. A message including the electronic wheel sensor identification code and the line identification code is provided by the assembly line transmitter/receiver system to an assembly line control system. A vehicle identification code is provided to the assembly line control system. The assembly line control system correlates the vehicle identification code, sensor identification code, and line identification code. This process is repeated for each wheel of the vehicle. When all of the wheel sensor identification codes are recorded, the assembly line production control system provides the information to the electronic control module of the vehicle.

According to other aspects of the invention, the method may comprise testing the electronic wheel sensors at a rolling test station wherein the sensors transmit data, including the wheel sensor identification code and a pressure sensor output to a vehicle receiver module that provides the data to the electronic control module of the vehicle. The electronic wheel sensor may also transmit a temperature sensor output. The production line control system may communicate with a display apparatus to provide a visual indication that the wheel sensors have been recorded in the memory of the assembly line control system. The assembly line transmitter/receiver system does not send the message to the assembly line control system if the assembly line identification code received from the electronic wheel sensor does not correspond to the line identification code transmitted in the first RF signal.

The vehicle's electronic control module may not be operational during the time that the RF signals are exchanged between the assembly line transmitter/receiver and the wheel sensors. The electronic control module of the vehicle may receive the wheel sensor identification codes by connecting to the assembly line control system through the data bus of the vehicle.

These and other aspects of the present invention will be better understood in view of the attached drawings and following detailed description of the invention.

DETAILED DESCRIPTION OF THE PREFERRED EMBODIMENT(S)

Figure 1:
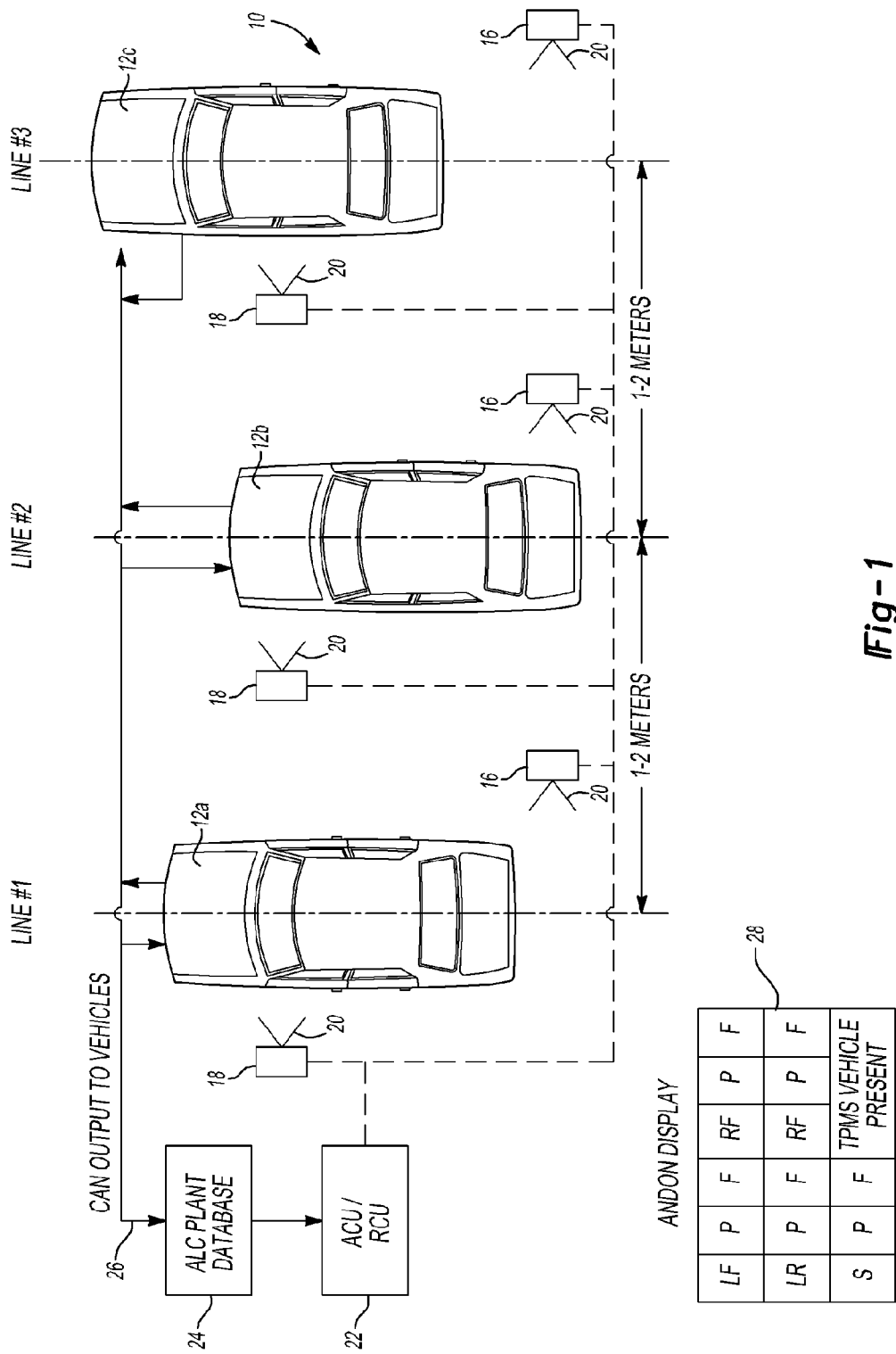
FIG. 1 is a diagrammatic view of a portion of a vehicle assembly line at which tire pressure monitoring systems are identified.

Referring to FIG. 1, a portion of an assembly line 10 is illustrated in which electronic wheel sensors that are mounted within each of the tire/wheel assemblies of a vehicle are programmed and identified. Three vehicles 12a, 12b, and 12c are illustrated on the assembly line 10. The assembly line 10 may be three separate assembly lines or a single assembly line that splits into three separate lines for final assembly and inspection. Each of the lines has a right transmitter/receiver 16 for programming and communicating with electronic wheel sensors on the right side of the vehicle. A left transmitter/receiver 18 is provided for communicating with electronic wheel sensors on the left side of the vehicle. If an electronic wheel sensor is to be programmed that is in the spare tire, either a hand tool or an additional transmitter/receiver that is located near the spare tire may be used to communicate with the electronic wheel sensor in the spare tire.

A photoelectric eye (not shown), limit switch, proximity sensor, or other detector may be used to detect the presence and position of a vehicle 12 on one of the lines. Upon detection of a vehicle in the proper position in the line, the transmitter/receiver 16, 18 communicates through a directional finding antenna 20 with electronic wheel sensors in the tire/wheel assemblies. The directional finding antenna 20 may provide date, time and assembly line identification that is used to identify the assembly line to the electronic wheel sensor.

A control unit 22 receives electronic signals from the transmitter/receiver 16, 18. The control unit 22 includes an antenna control unit for controlling the directional finding antenna 20 and a reader control unit that reads the digital bit streams received from the electronic wheel sensors. Information received from the control unit 22 is provided to the assembly line control database that records information relating to the identity of the electronic wheel sensor and production line data. The assembly line control database provides data relating to the electronic wheel sensor to the CAN output line 26 at a subsequent assembly line station.

The control unit 22 also provides data on the assembly line via an Andon display 28. The Andon display 28 may be reviewed by line operators to verify that the electronic wheel sensor identification system is functioning properly and each of the electronic wheel sensors is functioning as designed.

The portion of the assembly line 10 at which the electronic wheel sensors are identified to the production line may be a portion of an assembly line that precedes installation of the vehicle battery. If so, the electronic wheel sensor identification information may be correlated to a particular vehicle and programmed into the vehicle by means of the CAN output on the assembly line after power is available to the vehicle from the electronic system of the vehicle.

The spacing between vehicles may be fairly limited. For example, the space between adjacent vehicles may be between and one and two meters. With this close spacing, radio frequency transmission of digital data may be received by transmitter/receiver 16 and 18 that are associated with an adjacent line. To avoid erroneous data from being recorded or being recorded by the wrong transmitter/receiver 16, 18, the system of the present invention utilizes special line identification bits in the bit stream transmitted and received by the electronic wheel sensors and transmitter/receiver 16, 18, as will be more particularly described below.

Figure 2:
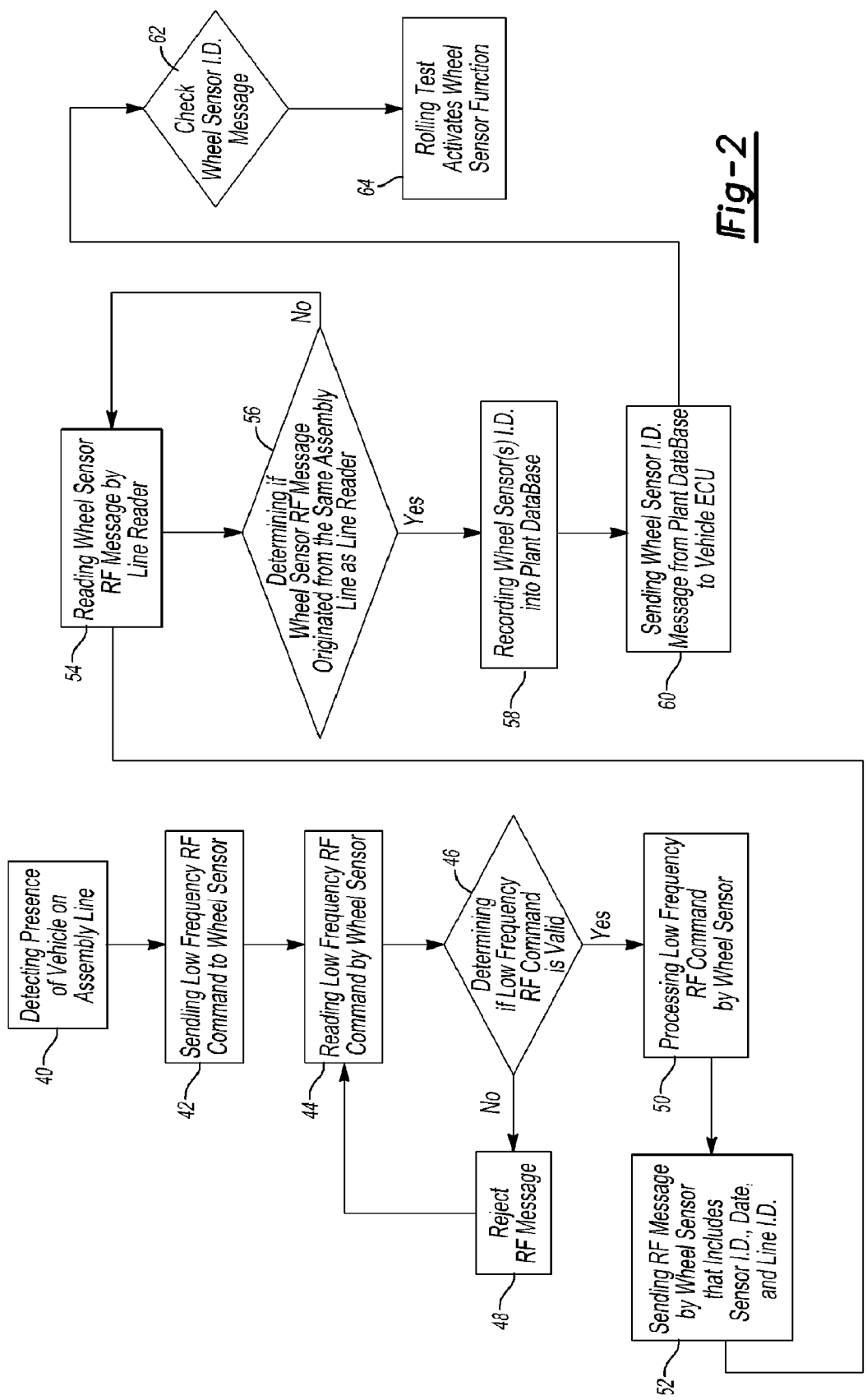
FIG. 2 is a flowchart of the method for registering wheel sensor identification designations according to one embodiment of the present invention.

Referring to FIG. 2, the process begins at 40 wherein the presence of a vehicle is detected on a vehicle assembly line. The presence of the vehicle may be detected by a photoelectric cell, limit switch, proximity switch, or other sensor. The detector is preferably triggered by the wheel of a vehicle as it moves along the assembly line.

The directional finding antenna then sends a low frequency command to a wheel sensor at 42. A low frequency command may be a special factory command transmitted at a low frequency, e.g., 125 KHz, that is sent directionally to the electronic wheel sensor. The electronic wheel sensor determines if the low frequency RF command is valid at 46 by comparing the low frequency command signal to the command signal format required by the electronic wheel sensor. If the low frequency command is not valid, the RF message is rejected at 48 and the wheel sensor continues to look for a low frequency RF command. When a valid low frequency RF command is received at 46, the electronic wheel sensor processes the low frequency RF command at 50.

A message is sent at 52 by the electronic wheel sensor to the transmitter/receiver 16, 18. The message sent by the electronic wheel sensor may include, for example, the sensor ID and line ID. This message is received at 54 by the line reader, or control unit 22. The line reader, at 54, reads the electronic wheel sensor RF message. Then, at 56, the wheel sensor RF message is tested to determine if the wheel sensor message originated from the same assembly line as the line reader that initiated the low frequency RF command at 44.

If the wheel sensor RF message did not originate from the same assembly line as the initiating line reader, the system returns to 54 to read the next wheel sensor RF message. If the wheel sensor ID message originated from the same assembly line as the initiating line reader at 56, the wheel sensor ID is recorded into the plant database at 58. Next, the wheel sensor ID message is sent from the plant database to the vehicle ECU by means of the CAN output line 26 at 60.

The wheel sensor ID message is checked, at 62, in an exchange of electronic communications between the vehicle electronic control unit and the assembly line control plant database. Finally, the vehicle proceeds to a rolling test station, at 64, where the wheel sensor function is activated by rolling the vehicle wheels at a predetermined speed that causes the electronic wheel sensor to wake up and begin transmitting a data signal to the vehicle ECU.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for registering wheel sensor identification designations in a manufacturing environment in which a plurality of vehicles are located on different assembly lines in close proximity within the manufacturing environment, each of the vehicles have a plurality of wheels having a sensor capable of receiving a command signal, the method comprising:
   for each wheel, transmitting a command signal from an assembly line associated transmitter/receiver to the sensor associated with the wheel;
   generating a responsive signal from the sensor including a unique sensor identification designation and an assembly line identifier in response to the received command signal; and
   recording in an assembly line database the unique sensor identification designation and assembly line identifier for each wheel sensor based on the responsive signal and thereby registering the wheel sensor identification designations and the assembly line identifier.

2. The method of claim 1 wherein the command signal is transmitted through a directional finding antenna proximate to one of the assembly lines.

3. The method of claim 1 wherein the responsive signal is received by the same assembly line associated transmitter/receiver that transmitted the command signal.

4. The method of claim 1 wherein the command signal is broadcast at a first frequency and the responsive signal is broadcast at a second frequency that is different from the first frequency.

5. The method of claim 1 wherein the step of recording the wheel sensor identification designation and assembly line identifier for each wheel sensor in the assembly line database further comprises communicating the wheel sensor identification designation for each wheel sensor from the assembly line database to a vehicle on-board control module at a subsequent station on the assembly line.

6. The method of claim 5 further comprising operating the vehicle at a rolling test station on the assembly line to cause the wheel sensors to transmit data to an on-board control module after the wheel sensor identification has been communicated to the control module.

7. The method of claim 1 further comprising indicating the operational status of the wheel sensors on an assembly line production information system display.

8. A method of installing a plurality of tire pressure monitoring systems on a plurality of vehicles on separate assembly lines, the method comprising performing the following steps on each of the assembly lines:
   (a) sensing of a vehicle on one of the assembly lines;
   (b) sending a first RF signal from an assembly line associated transmitter/receiver system on one of the assembly lines to a selected one of a plurality of electronic wheel sensors of one of the vehicles, the first RF signal including at least a command code and a line identification code;
   (c) sending a second RF signal that is responsive to the command code from the electronic wheel sensor to the assembly line associated transmitter/receiver system, the second RF signal having at least an electronic wheel sensor identification code and the line identification code;
   (d) providing a message including at least the electronic wheel sensor identification code and line identification code from the assembly line associated transmitter/receiver system to an assembly line control system;
   (e) providing a vehicle identification code to the assembly line control system;
   (f) correlating the message to the vehicle identification code by the assembly line control system;
   (g) repeating steps (b) through (f) for each wheel of the vehicle; and
   (h) providing at least the electronic wheel sensor identification code for each wheel to an electronic control module of the vehicle from the assembly line production control system.

9. The method of claim 8 wherein the manufacturing lines have a rolling test station at which a plurality of wheels are rotated in a test after step (h), the method further comprising the electronic wheel sensor being activated at the rolling test station and transmitting data including at least the wheel sensor identification code, and a pressure sensor output to a vehicle receiver module that provides the transmitted data to the electronic control module of the vehicle.

10. The method of claim 9 wherein the electronic wheel sensor also transmits a temperature sensor output.

11. The method of claim 8 wherein the production line control system communicates with a display apparatus to provide a visual indication that each electronic wheel sensor identification code is recorded by a memory of the assembly line control system.

12. The method of claim 8 wherein the assembly line associated transmitter/receiver system does not send the message in step (e) if the line identification code received from the electronic wheel sensor does not correspond to the line identification code transmitted in step (b).

13. The method of claim 8 wherein the electronic control module of the vehicle is not operational when the RF signals are sent between the assembly line transmitter/receiver and the wheel sensors.

14. The method of claim 8 wherein step (h) is performed by connecting a data link to a vehicle data bus.

* * * * *